United States Patent [19]
Rahwan

[11] Patent Number: 5,339,546
[45] Date of Patent: Aug. 23, 1994

[54] ORGANIZING AND SCHEDULING DEVICE

[76] Inventor: Michael Rahwan, 2 Marson La., Sharon, Mass. 02067

[21] Appl. No.: 883,302

[22] Filed: May 14, 1992

[51] Int. Cl.$^5$ ............................................. G09D 3/00
[52] U.S. Cl. ......................................... 40/107; 40/122
[58] Field of Search .................. 40/122, 107, 119, 393

[56] References Cited

U.S. PATENT DOCUMENTS

| | | |
|---|---|---|
| 1,139,159 | 5/1915 | Bossart . |
| 1,594,563 | 8/1926 | Robinson ............................ 40/119 |
| 4,330,951 | 5/1982 | Hauer . |
| 4,451,067 | 5/1984 | Williams . |
| 4,572,547 | 2/1986 | Phillips . |
| 4,794,711 | 1/1989 | Christensen . |
| 4,803,795 | 2/1989 | Questel et al. . |
| 4,815,225 | 3/1989 | Wilen . |
| 4,850,124 | 7/1989 | Wilen . |
| 4,858,350 | 8/1989 | Malarchik ............................ 40/119 |
| 4,905,388 | 3/1990 | Sinkow . |
| 4,975,061 | 12/1990 | Avrill ................................. 40/107 |
| 5,106,122 | 4/1992 | Perelman ............................ 40/107 |

FOREIGN PATENT DOCUMENTS 315135  7/1953  Switzerland ........................... 40/119

Primary Examiner—Kenneth J. Dorner
Assistant Examiner—C. Davis
Attorney, Agent, or Firm—Fish & Richardson

[57] ABSTRACT

An organizing and scheduling device allows convenient organization of the multitude of notes, reminders and appointment cards which accumulate, e.g. in a home, correlating each reminder with the corresponding date on a calendar. The device includes a calendar, a color coded scale displayed upon a front surface of the device, and a set of flexible, multi-pocketed sheets behind the calendar. The coded scale includes a plurality of boxes of different colors, each box adjacent a week on the calendar. Each pocketed sheet has a tab disposed on lower edge, each tab being of a color corresponding to one of the colored boxes and horizontally offset from adjacent tabs to avoid complete overlap. The calendar and pocketed sheets are releasably bound together, and may be mounted upon a surface, e.g. of a refrigerator.

17 Claims, 9 Drawing Sheets

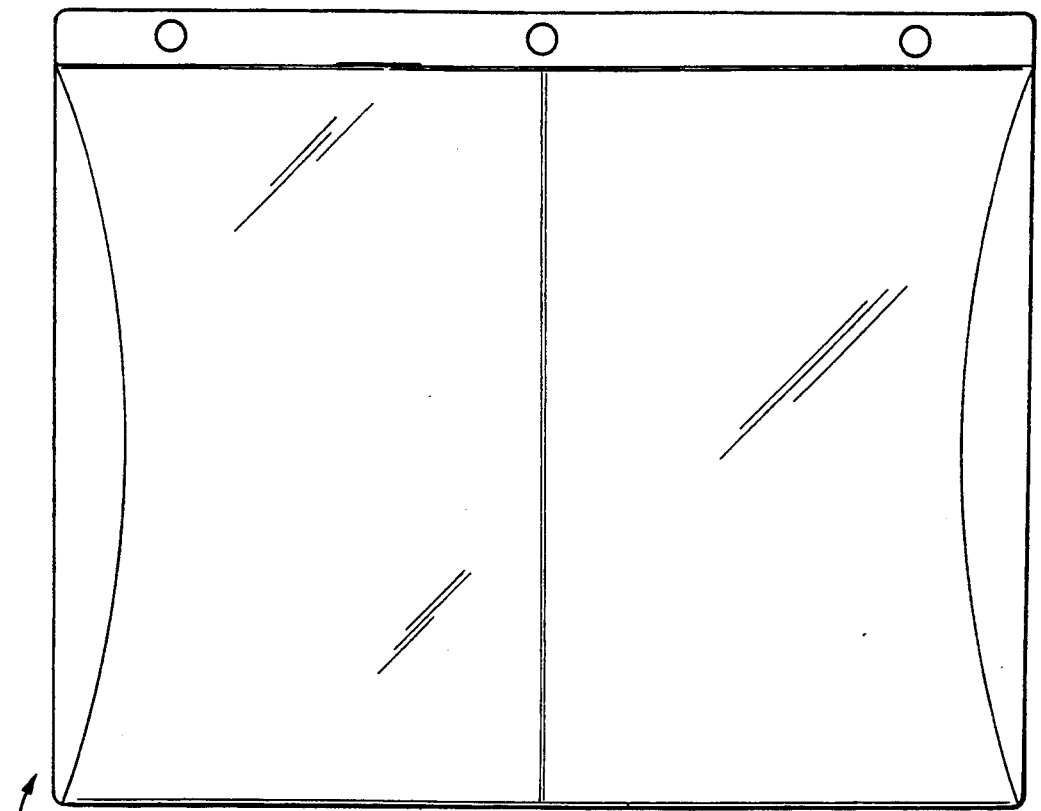
22i    FIG. 2D
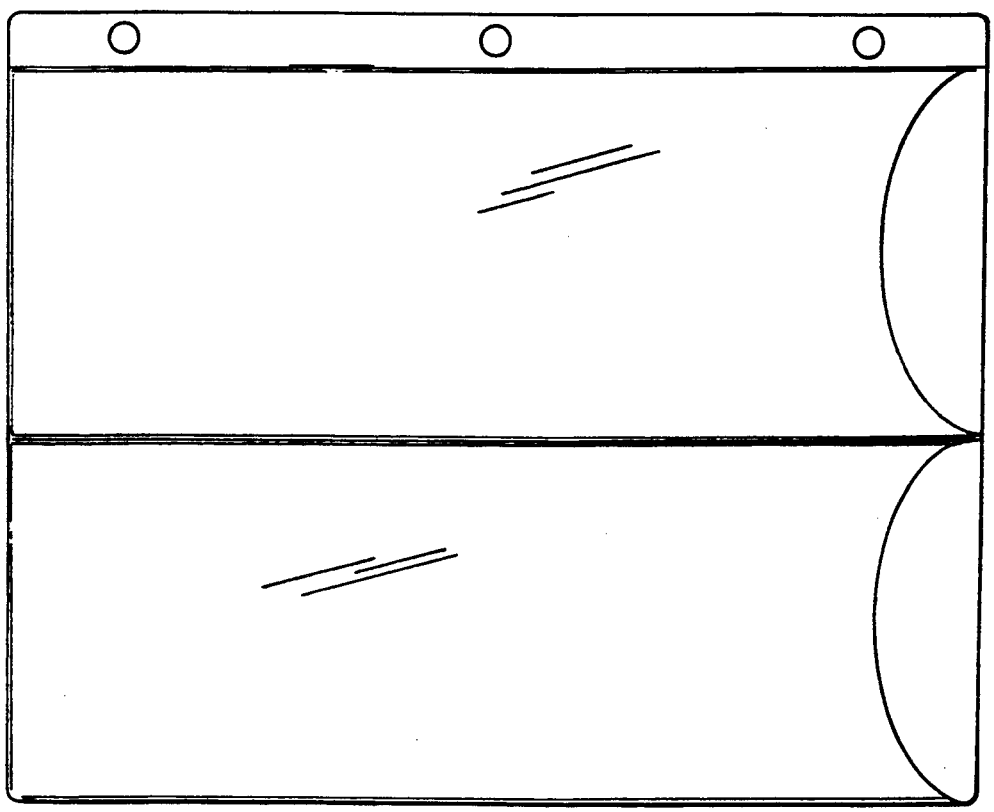
22j    FIG. 2E

22k

ORGANIZING AND SCHEDULING DEVICE

BACKGROUND OF THE INVENTION

The invention relates to devices for organizing the schedule of a family or an individual.

Organizing and scheduling devices known in the art include those having pockets for retaining receipts and the like. For example, Williams U.S. Pat. No. 4,451,067 describes a management scheduling folder consisting of multiple panels, each having pockets for supporting columns of project cards. Questrel et al. U.S. Pat. No. 4,803,795 describes a home organizer consisting of a sheet with a series of parallel slots for receiving receipts, each slot for a given month. Sinkow U.S. Pat. No. 4,905,388 describes an organizer and reminder with containers mounted on a calendar for holding medicant and pills.

SUMMARY OF THE INVENTION

The present invention features an organizing and scheduling device which allows a user to conveniently organize the multitude of notes, reminders and appointment cards which accumulate, e.g., on the refrigerator, in a home, correlating each reminder with the corresponding date on the calendar.

According to one aspect of the invention, an organizing and scheduling device comprises a calendar having a plurality of weeks displayed on a face surface thereof; a color coded scale displayed upon a front surface of the device, the color coded scale including a plurality of colored boxes of different colors, each colored box displayed adjacent a week on the calendar; a set of flexible pocketed sheets disposed generally behind the calendar, each pocketed sheet defining at least one pocket, and each pocketed sheet having a tab disposed on lower edge, each tab being of a color corresponding to one colored box and horizontally offset from adjacent the tabs in a manner to avoid complete overlap; means for mounting the calendar and the set of flexible pocketed sheets upon a display surface; and means for releasable binding of the calendar and the set of flexible pocketed sheets.

Preferred embodiments of an organizing and scheduling device of this aspect of the invention may include one or more of the following features. The means for releasable binding of the calendar includes a binder element comprising a binder body, a binder wall joined in hinged connection to the binder body, and a set of posts having free ends. The binder wall is adapted for movement relative to the binder body between a first, open position and a second, closed position. When the binder wall is in the second, closed position, the free ends of the set of posts being disposed in close proximity to an opposed surface of the binder element, and when the binder wall is in the first, open position, the free ends of the set of posts being removed from close proximity with the opposed surface. The device further comprises a snap lock for releasably securing the binder wall in the second, closed position. Preferably, the calendar and set of flexible pocketed sheets define corresponding sets of apertures, binder element being adapted, in first position of the binder wall, for receiving the calendar and set of flexible pocketed sheets upon the posts, and the binder element being adapted, in second position of the binder wall, for secure display of the calendar and set of flexible pocketed sheets disposed upon the posts. The set of pocketed sheets include at least one sheet of transparent or translucent plastic. At least one pocketed sheet defines a plurality of pockets. The device comprises at least one flexible pocketed sheet in addition to the set of flexible pocketed sheets. The means for mounting the calendar upon a display surface comprises a releasable fastener consisting of a pair of opposed elements of a hook-and-loop type fastener. Preferably one opposed element of the hook-and-loop type fastener has an adhesive layer surface for attachment of the opposed element upon the display surface. The device further comprises a markable surface for receiving written notes. The device further comprises a pad of a plurality of sheets of paper, a front surface of the pad being displayed upon a front surface of the device. Preferably, the calendar, the set of flexible pocketed sheets and the pad define corresponding sets of apertures, the binder element being adapted, in first position of the binder wall, for receiving the calendar, set of flexible pocketed sheets and pad upon the posts, and the binder element being adapted, in second position of the binder wall, for secure display of the calendar, set of flexible pocketed sheets and pad disposed upon the posts. The color coded scale displayed upon a front surface of the device is displayed upon a face surface of the calendar. In other embodiments, the means for releasable binding of the calendar comprises threaded connectors extending through apertures defined in the calendar and set of flexible pocketed sheets; the device further comprises a clip for holding a writing implement and the means for mounting the calendar upon a display surface comprises a rear sheet of magnetic material.

According to another aspect of the invention, a method of organizing and scheduling an appointment comprises the steps of: (a) providing an organizing and scheduling device comprising a calendar having a plurality of weeks displayed on a face surface thereof; a color coded scale displayed upon a front surface of the device, the color coded scale including a plurality of colored boxes of different colors, each colored box displayed adjacent a week on the calendar; a set of flexible pocketed sheets disposed generally behind the calendar, each pocketed sheet defining at least one pocket, and each pocketed sheet having a tab disposed on lower edge, each tab being of a color corresponding to one colored box and horizontally offset from adjacent the tabs in a manner to avoid complete overlap; means for mounting the calendar and the set of flexible pocketed sheets upon a surface; and means for releasable binding of the calendar and the set of flexible pocketed sheets; (b) mounting the organizing and scheduling device with a current month displayed on the calendar; (c) noting the appointment on a week of the calendar; (d) observing the color of the colored box adjacent the week; and (e) placing an appointment slip in a pocket of the pocketed sheet which has a tab of the same color as the colored box.

Objectives of the invention include providing an organizing and scheduling device which may be mounted in a convenient location, e.g., on the refrigerator, with the current month displayed on the calendar. Each appointment may, if desired, be noted on the calendar. Then, referring to the colored box adjacent the appropriate week, the appointment slip or reminder is placed in a pocket of the intervening sheet which has a tab of the same color.

Other features and advantages of the invention will be apparent from the following description of a presently preferred embodiment thereof, and from the claims.

BRIEF DESCRIPTION OF THE DRAWINGS

FIG. 1 is a front view of an organizing and scheduling device according to one embodiment of the invention, while

FIGS. 2 and 2a-2f are front views of flexible pocketed sheets employed in an organizing and scheduling device of the invention;

FIG. 5 is a rear view of the organizing and scheduling device of FIG. 1, while

DESCRIPTION OF A PRESENTLY PREFERRED EMBODIMENT

Figure 1:
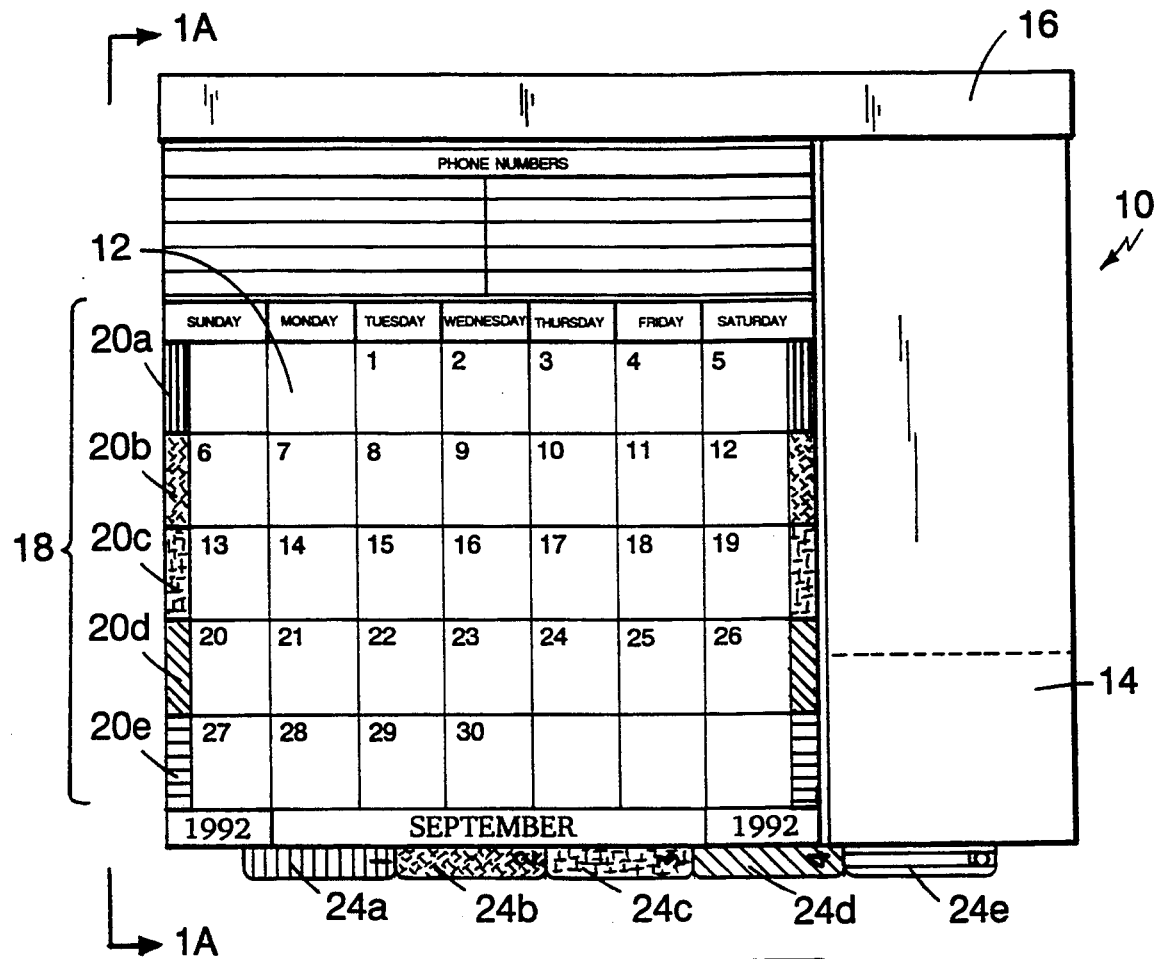
Figure 1A:
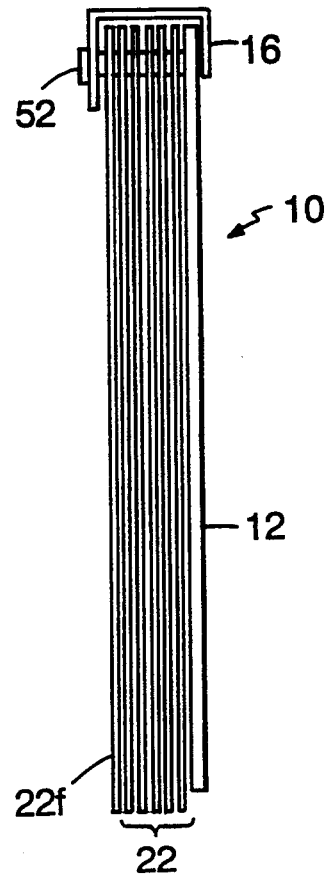
FIG. 1a is a side view of the device taken at the line 1a—1a of FIG. 1.

Referring to FIG. 1, an organizing and scheduling device 10 of the invention consisting of a calendar 12 and a note pad 14 suspended from a releasable binder 16. The calendar has a plurality of weeks displayed on a face surface, with a color coded scale 18 including a plurality, e.g. five, of colored boxes 20a-20e of different colors displayed on each calendar sheet, with each colored box displayed adjacent a week on the calendar sheet.

Figure 2:
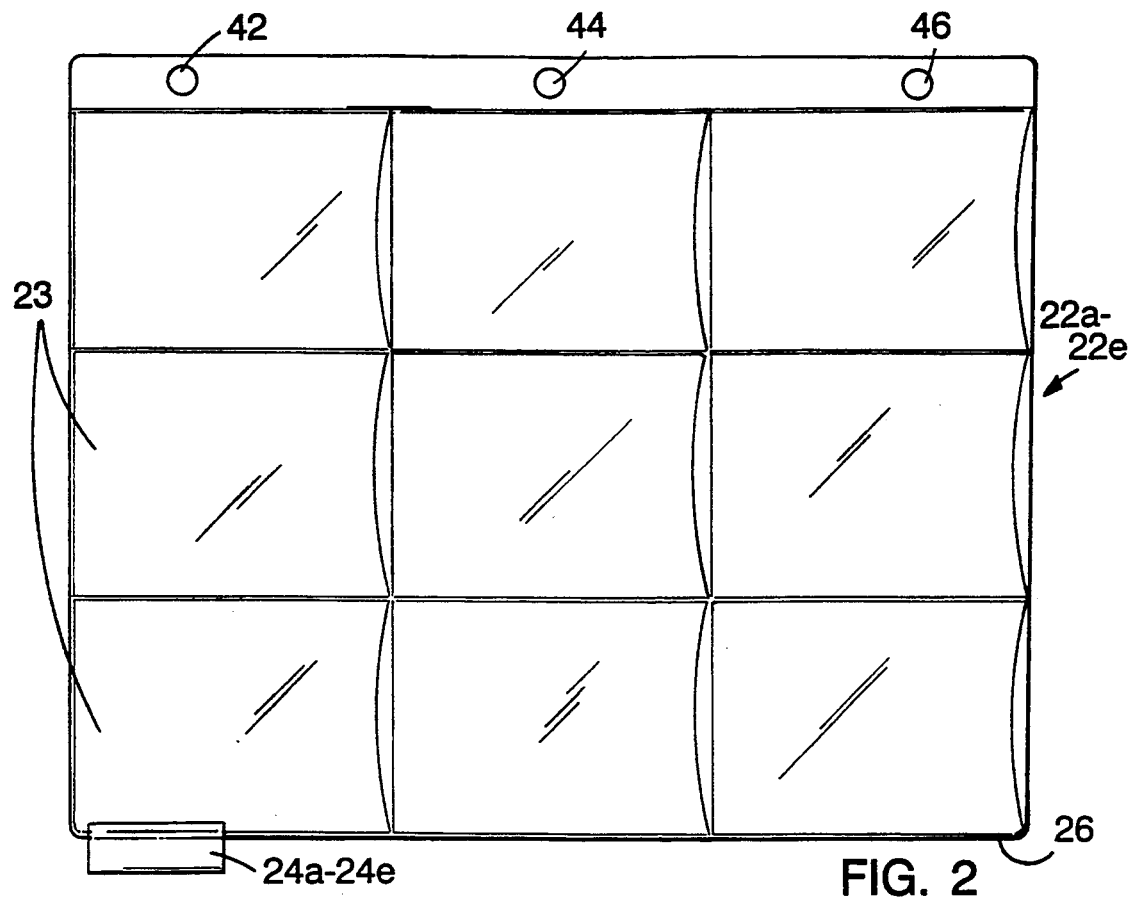
Figure 2A:
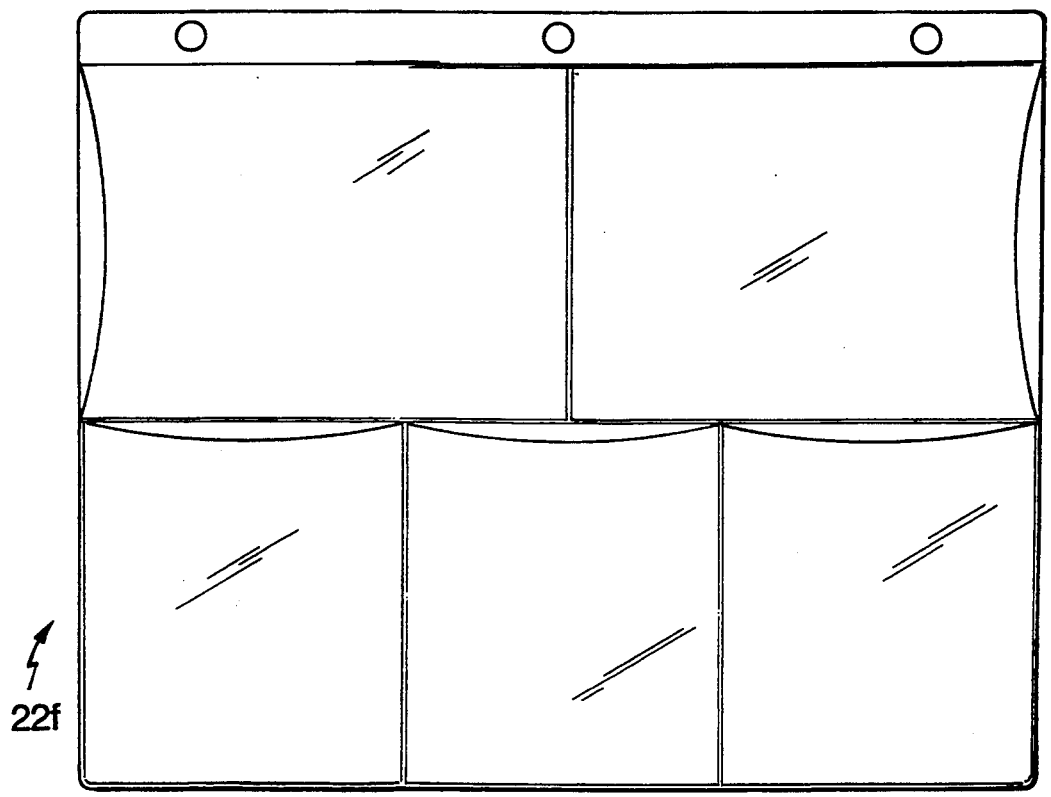
Figure 2B:
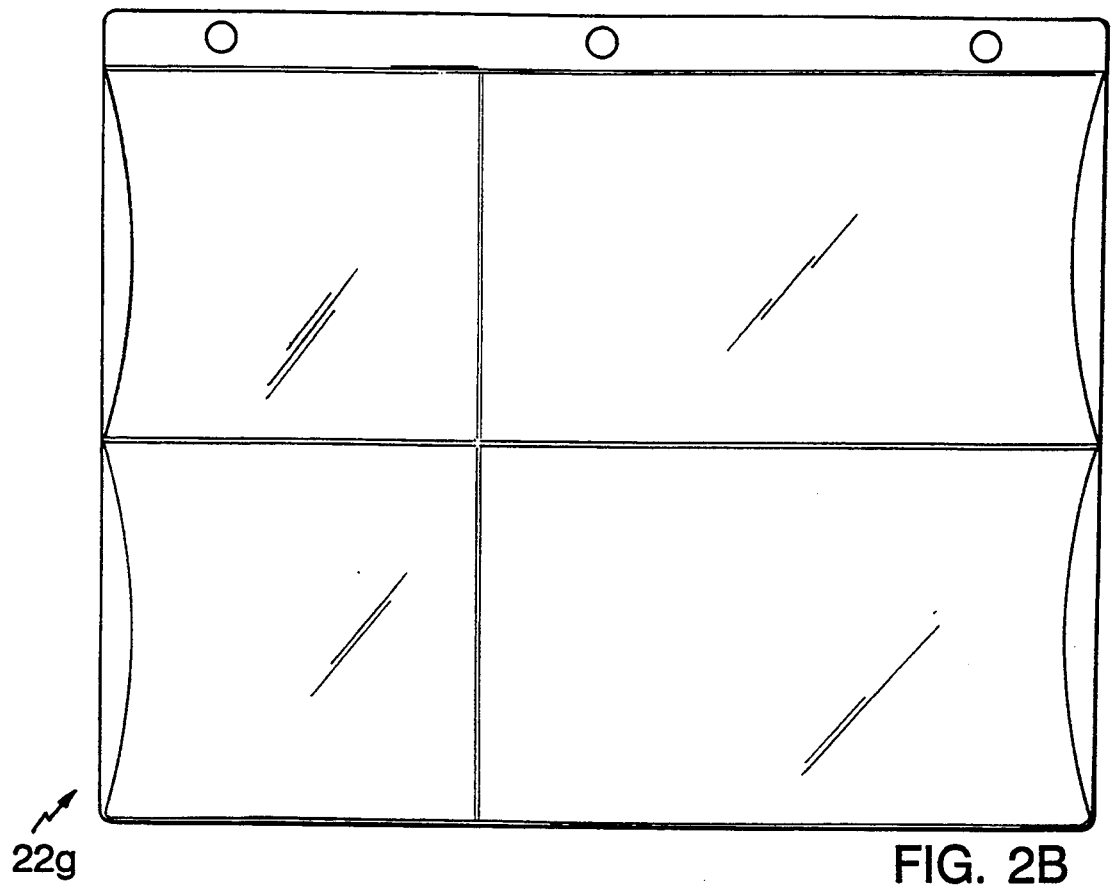
Figure 2C:
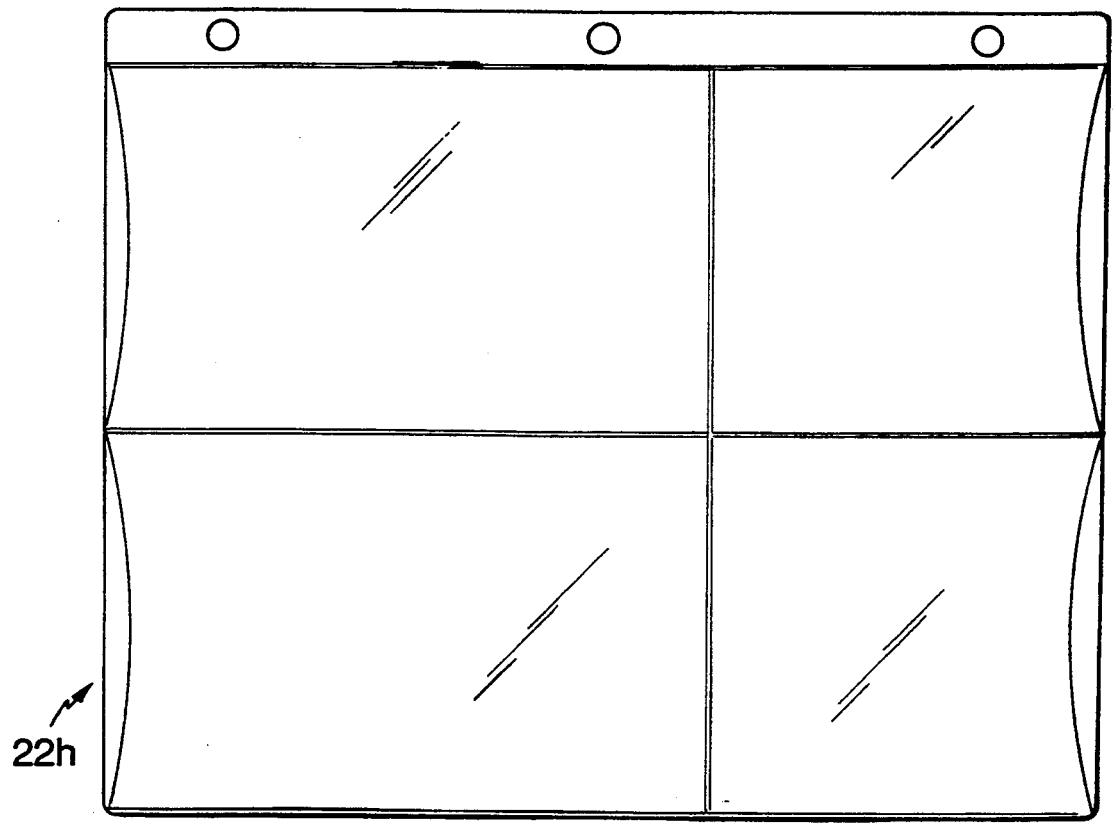
Figure 2F:
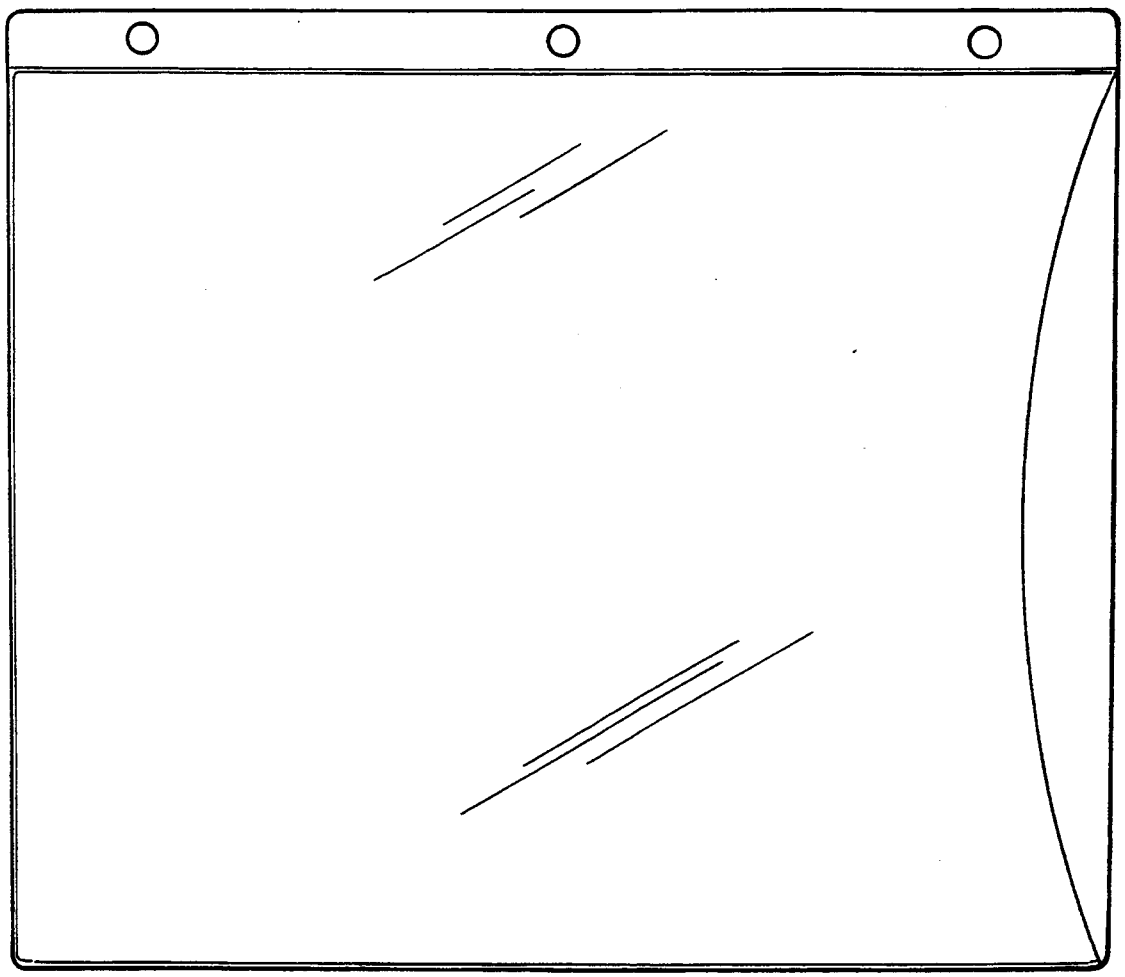

Disposed behind the calendar and note pad, similarly suspended from the binder, are a set of flexible pocketed sheets 22, e.g. a transparent or translucent plastic. Referring to FIG. 2, in the preferred embodiment, each pocketed sheet 22a-22e of the set 22 has nine pockets 23, with a tab 24a-24e disposed along the lower edges 26 of the sheets, each tab being of a color corresponding to one of the colored boxes 20a-20e, and being horizontally offset from adjacent tabs in a manner to avoid complete overlap. Referring to FIGS. 2a-2f, pocketed sheets 22f-22k with other arrangements of pockets (with or without tabs) may also be provided.

Figure 3:
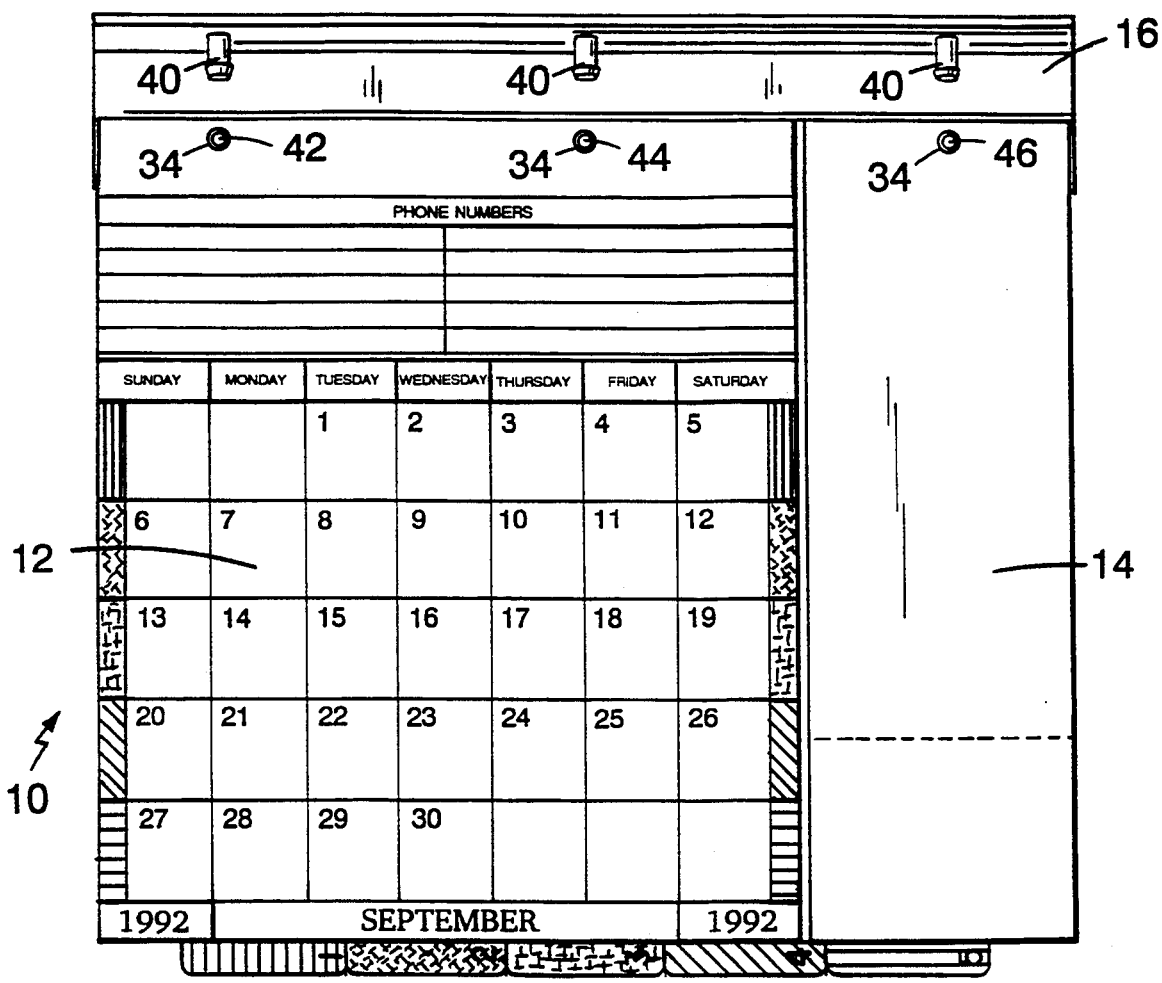
FIG. 3 is another front view of the organizing and scheduling device of FIG. 1, with the releasable binder open.
Figures 4, 4A:
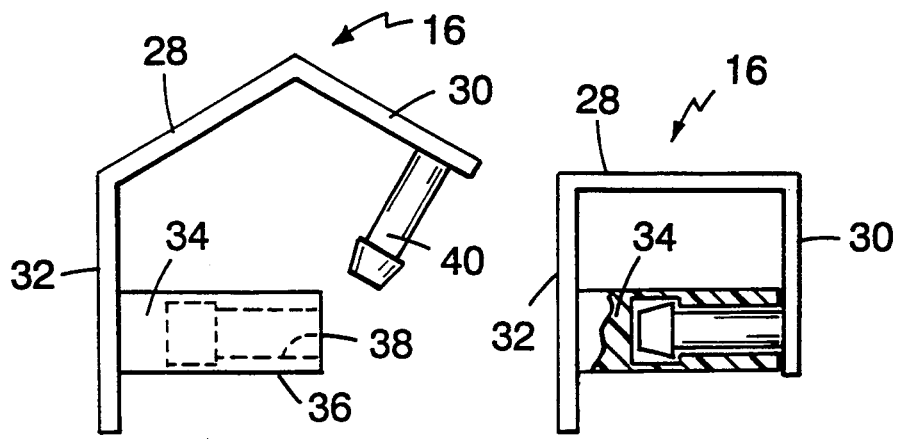
FIGS. 4 and 4a are side section views of the binder in open and closed position, respectively.

Referring now to FIGS. 3 and 4-4a, the releasable binder 16 has a center binder portion 28, with a front flap 30 and a rear flap 32 joined in hinged connection thereto. The rear flap 32 defines front flap 30 a set of posts 34, e.g. three are shown having free ends 36 defining a cylindrical orifice 38. The front flap 30 defines a corresponding set of pins 40 sized for snap fit, releasable engagement within the orifice 38 in the free end 36 of the corresponding post 34. The front flap 30 is thus adapted for movement relative to the center binder portion 28 between a first, open position (FIG. 3), and a second, closed position (FIG. 1).

The calendar 12, the note pad 14 and the set of flexible pocketed sheets 20 each define corresponding sets of apertures 42, 44, 46 aligned with the posts 34 defined by the binder 16. (Apertures 42, 44 are defined by the calendar, aperture 46 is defined by the note pad, and the set 22 of pocketed sheets define apertures 42, 44, 46.) The binder 16, in its first position, the binder 16 permits removal or replacement of the calendar 12 or calendar pages, the note pad 14 or flexible pocketed sheets 22 upon the posts 34. In its second position, the binder provide for secure display of the calendar, note pad and set of flexible pocketed sheets disposed upon the posts.

Figure 5:
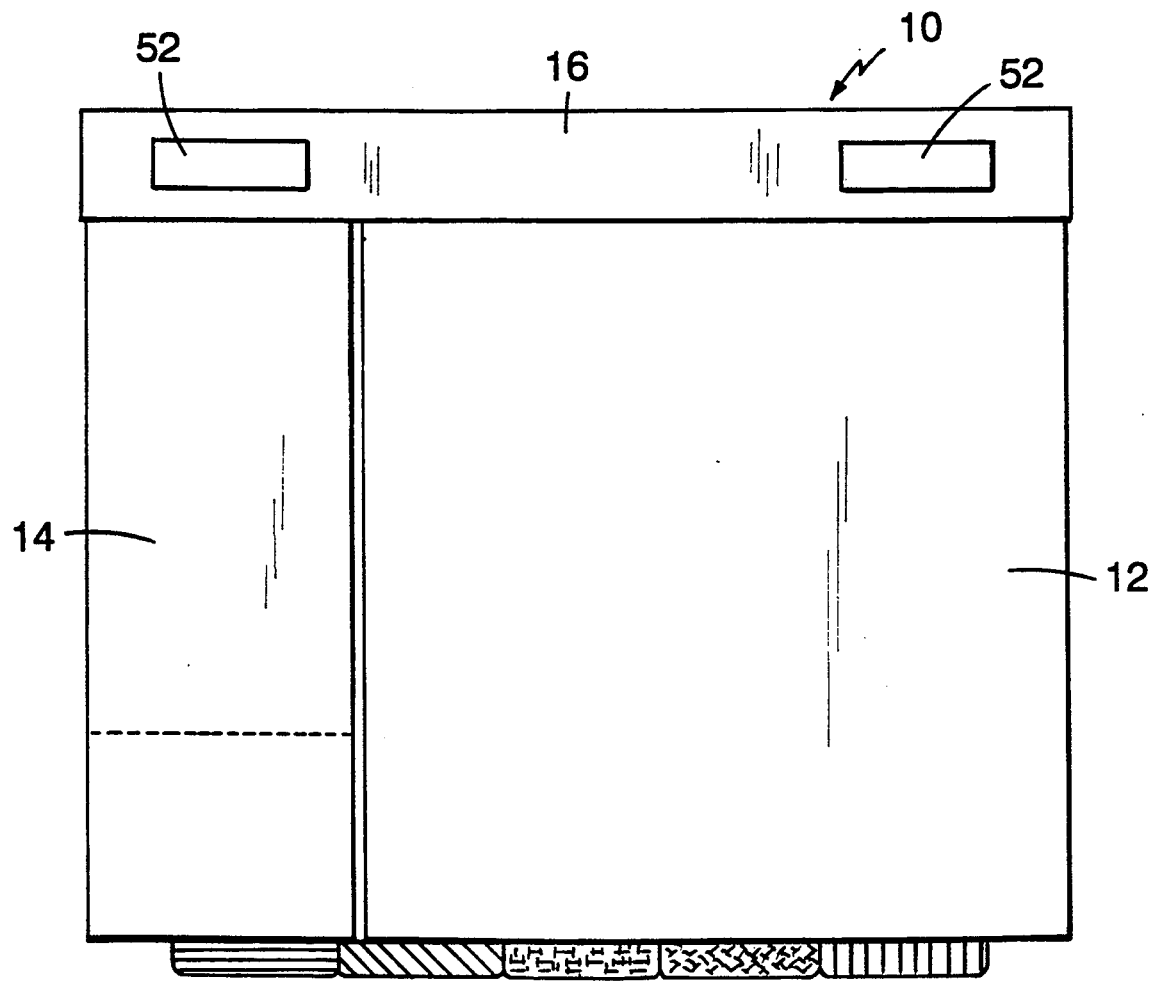
Figure 5A:
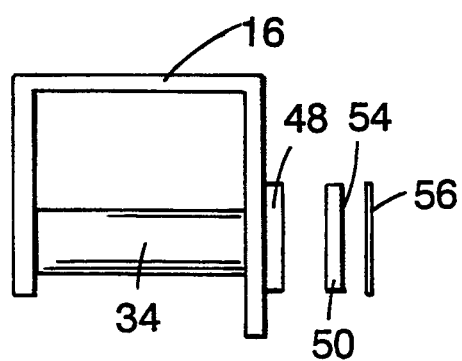
FIG. 5a is an exploded side view of a hook-and-loop type mounting for the device.

Referring now to FIGS. 5 and 5a, in the preferred embodiment, the organizing and scheduling device 10 of the invention is releasably mounted upon a display surface, e.g. upon the refrigerator or a kitchen or office wall, by means of a pair of opposed elements 48, 50 of a hook-and-loop type fastener 52. Referring also to FIG. 5a, element 48 is fixedly attached to the rear surface of the device 10, and element 50 has an adhesive surface 54 which may be exposed by removal of the cover sheet 56 for fixed attachment of the element 50 upon the display surface.

The device 10 of the invention may be used for organizing and scheduling the numerous appointments that affect a family or an office. The device 10 is mounted with a current month displayed on the calendar. Each appointment is noted on the calendar surface. The color of the box on the scale adjacent the week of the appointment is noted, and the appointment slip is placed in a pocket of the pocketed sheet which has a tab of the same color as the colored box.

Figure 6:
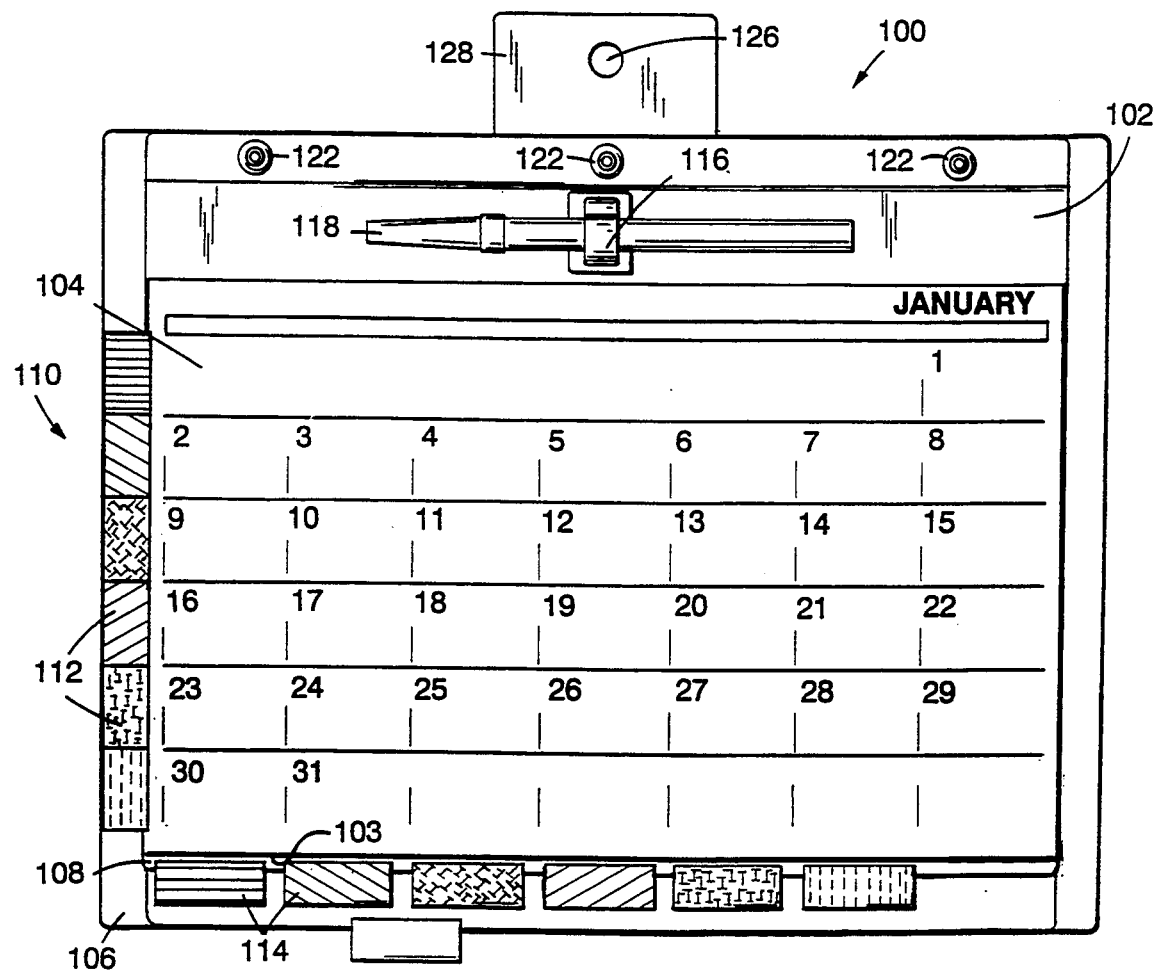
FIG. 6 is a front view of an organizing and scheduling device according to another embodiment of the invention.
Figure 7:
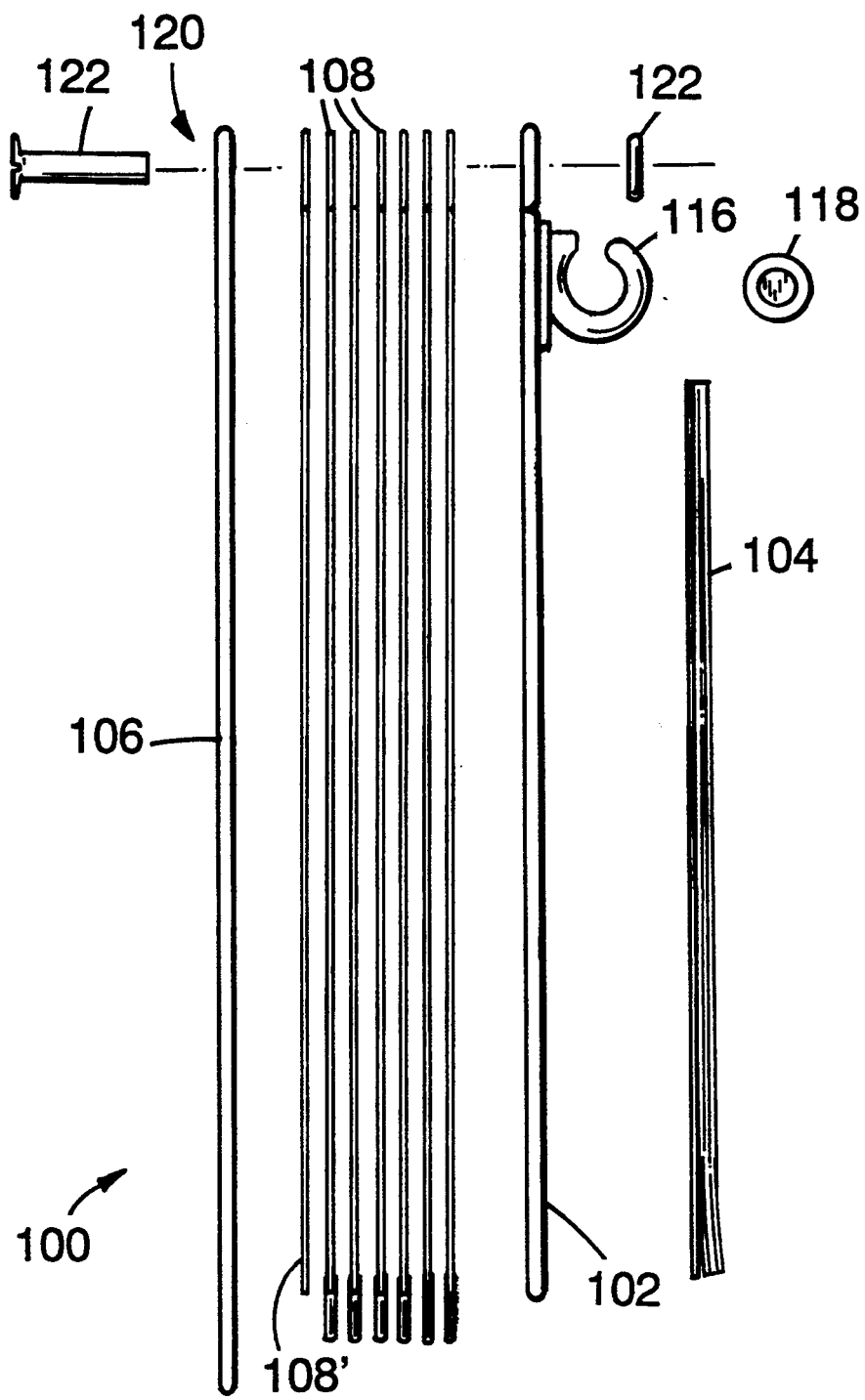
FIG. 7 is an exploded, enlarged side view of the organizing and scheduling device of FIG. 6.

Other embodiments are within the following claims. For example, referring to FIGS. 6 and 7, an organizing and scheduling device 100 has a front sheet 102, with a pocket for receiving and displaying a calendar 104, a rear sheet 106 of magnetic material, and a plurality, e.g. six or more, of flexible plastic intervening sheets 108. The front sheet 102 has a color-coded scale 110, having six colored boxes 112 of different colors, each box adjacent a different week on calendar 104. (In this embodiment, at least six tabs are provided to cover the maximum number of full and partial weeks in a single month.)

Intervening sheets 108 have tabs 114 of colors corresponding to the boxes 112 on the scale 110. Tabs 114, each offset horizontally from adjacent tabs, are displayed in the region along the bottom edge 103 of the front sheet 102. Sheet 109 is an additional flexible pocketed sheet.

Front sheet 102 also has a clip 116, for holding a writing implement 118, e.g. a pen or pencil.

The front sheet 102, rear sheet 106 and intervening sheets 108 are joined along the top region 120 by threaded connectors 122 disposed through apertures 124 in the intervening sheets and corresponding apertures in the front and rear sheets.

The organizing and scheduling device 100 can be mounted to a metallic object, e.g., the front of a refrigerator, by means of magnetic rear sheet 106, or to a non-metallic surface, e.g., a wall, by means of a pin or nail (not shown) disposed through hole 126 in flap 128.

What is claimed is:

1. An organizing and scheduling device comprising
    a calendar having indicia representing a plurality of weeks displayed on a face surface thereof;
    a color coded scale including a plurality of colored regions of different colors, each colored region displayed adjacent a week on said calendar;
    a plurality of flexible pocketed sheets disposed generally behind said calendar, each flexible pocketed sheet defining at least one pocket, and each said flexible pocketed sheet having a tab disposed on a lower edge, each said tab being of a color corresponding to one said colored region and horizontally offset from adjacent said tabs in a manner to avoid complete overlap;

means for mounting said calendar and said plurality of flexible pocketed sheets upon a display surface; and means for releasable binding together of said calendar with said plurality of flexible pocketed sheets.

2. The organizing and scheduling device of claim 1 wherein said means for releasable binding of said calendar includes a binder element comprising a binder body, a binder wall joined in hinged connection to said binder body, and at least one post having a first end joined to said binder wall and having a second free end extending from said binder wall, said binder wall with said at least one post joined thereto adapted for movement relative to said binder body between a first, open position and a second, closed position, when said binder wall is in said second, closed position, said free end of said at least one post being disposed at least closely adjacent to an opposed surface of said binder body, and when said binder wall is in said first, open position, said free end of at least one post being relatively more spaced from said opposed surface of said binder body, said device further comprising a snap lock for releasably securing said binder wall in said second, closed position.

3. The organizing and scheduling device of claim 2 wherein said calendar and said plurality of flexible pocketed sheets each have a margin defining corresponding apertures, said binder element being adapted, in said first position of said binder wall, for receiving said calendar and said plurality of flexible pocketed sheets upon said at least one post, and said binder element adapted, in said second position of said binder wall, for secure display of said calendar and said plurality of flexible pocketed sheets disposed upon said at least one post.

4. The organizing and scheduling device of claim 1 wherein said plurality of pocketed sheets include at least one sheet of transparent plastic.

5. The organizing and scheduling device of claim 1 wherein intervening sheets of said plurality of flexible pocketed sheets include at least one sheet of translucent plastic.

6. The organizing and scheduling device of claim 1 wherein at least one flexible pocketed sheet of said plurality of flexible pocketed sheets defines a plurality of pockets.

7. The organizing and scheduling device of claim 1 wherein said device comprises at least one flexible pocketed sheet in addition to said plurality of flexible pocketed sheets.

8. The organizing and scheduling device of claim 1 wherein said means for mounting said calendar upon a display surface comprises a releasable fastener consisting of a pair of opposed elements of a hook-and-loop type fastener.

9. The organizing and scheduling device of claim 8 wherein one element of said pair of opposed elements of a hook-and-loop type fastener has an adhesive layer surface for attachment of said element upon the display surface.

10. The organizing and scheduling device of claim 1 wherein said device defines a front surface comprising said face surface of said calendar, said color coded scale, and a markable surface for receiving written notes.

11. The organizing and scheduling device of claim 2 wherein said device further comprises a pad of a plurality of stacked sheets of paper, and said device defines a front surface comprising said face surface of said calendar, said color coded scale, and a front surface of a face sheet of said pad.

12. The organizing and scheduling device of claim 11 wherein said calendar, said plurality of flexible pocketed sheets and said pad each have margins which define corresponding apertures, said binder element adapted, in said first, open position of said binder wall, for receiving apertures of the margin of said calendar, apertures of the margin of said plurality of flexible pocketed sheets and apertures of the margin of said pad upon said at least one post, and said binder element adapted, in said second, closed position of said binder wall, for secure display of said calendar, said plurality of flexible pocketed sheets and said pad disposed upon said at least one post.

13. The organizing and scheduling device of claim 1 wherein said color coded scale is displayed upon the face surface of said calendar.

14. The organizing and scheduling device of claim 1 wherein said means for releasable binding of said calendar comprises threaded connectors extending through apertures defined in said calendar and said plurality of flexible pocketed sheets.

15. The organizing and scheduling device of claim 1 wherein said device further comprises a clip for holding a writing implement, and said device defines a front surface comprising said face surface of said calendar and said color coded scale, said clip being mounted upon said front surface of the device.

16. The organizing and scheduling device of claim 1 wherein said means for mounting said calendar upon a display surface comprises a rear sheet of magnetic material.

17. A method of organizing and scheduling an appointment comprising the steps of:
(a) providing an organizing and scheduling device comprising a calendar having indicia representing a plurality of weeks displayed on a face surface thereof; a color coded scale including a plurality of colored regions of different colors, each colored region being displayed adjacent a week on said calendar; a plurality of flexible pocketed sheets disposed generally behind said calendar, each flexible pocketed sheet defining at least one pocket, and each flexible pocketed sheet having a tab disposed on a lower edge, each said tab being of a color corresponding to one colored region and horizontally offset from adjacent said tabs in a manner to avoid complete overlap; means for mounting said calendar and said plurality of flexible pocketed sheets upon a display surface; and means for releasable binding of said calendar with said plurality of flexible pocketed sheets;
(b) mounting the organizing and scheduling device upon a display surface with a current month displayed on the calendar;
(c) recording the indicia an appointment on representing one of a plurality of weeks of the calendar;
(d) placing an appointment slip in a pocket of one of a plurality of flexible pocketed sheets having a tab of the same color as the colored region adjacent the indicia representing the week having the recorded appointment.

* * * * *